(12) United States Patent  
Bonnaffé et al.

(10) Patent No.: US 12,094,246 B1  
(45) Date of Patent: Sep. 17, 2024

(54) AUTOMATIC CAPTURE OF CONTENT USING SMILE DETECTION

(71) Applicant: GoPro, Inc., San Mateo, CA (US)

(72) Inventors: Séraphin Cyrille Philippe Bonnaffé, San Mateo, CA (US); Nicolas Chesné, San Mateo, CA (US); Steven Fortunato, Solana Beach, CA (US); Anaïs Oulès, Bordeaux (FR); Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 418 days.

(21) Appl. No.: 17/697,282

(22) Filed: Mar. 17, 2022

(51) Int. Cl.  
*G06V 40/16* (2022.01)  
*G06V 10/762* (2022.01)

(52) U.S. Cl.  
CPC .......... *G06V 40/174* (2022.01); *G06V 10/763* (2022.01); *G06V 2201/07* (2022.01)

(58) Field of Classification Search  
None  
See application file for complete search history.

(56) References Cited

U.S. PATENT DOCUMENTS

| | | | |
|---|---|---|---|
| 11,792,502 B2 * | 10/2023 | Knott | H04N 23/667 348/333.02 |
| 2022/0217265 A1 * | 7/2022 | Vacquerie | G06F 3/1423 |
| 2023/0362493 A1 * | 11/2023 | Thorn | H04N 23/65 |

* cited by examiner

*Primary Examiner* — Dov Popovici  
(74) *Attorney, Agent, or Firm* — ESPLIN & ASSOCIATES, PC

(57) ABSTRACT

An image capture device may analyze visual content to determine a smile aggregation value. The smile aggregation value satisfying a smile aggregation criterion may indicate that people depicted in the visual content are smiling. When the smile aggregation value satisfies the smile aggregation criterion, the capture of visual content may be started. When the smile aggregation value fails to satisfy the smile aggregation criterion, the capture of visual content may be stopped.

20 Claims, 5 Drawing Sheets

Smile Probability

|        | Image 01 | Image 02 | Image 03 | Image 04 |
|--------|----------|----------|----------|----------|
| Face A | 0        | 30       | 60       | 90       |
| Face B | 95       | 95       | 95       | 95       |
| Face C | 50       | 50       | 50       | 50       |
| Face D | 90       | 60       | 30       | 0        |

FIG. 4

AUTOMATIC CAPTURE OF CONTENT USING SMILE DETECTION

FIELD

This disclosure relates to an image capture device that automatically captures content using smile detection.

BACKGROUND

Starting capture of images/videos using manual triggers may be inconvenient or unreliable. For example, an image capture device may have voice control enabled to allow a user to start capture of images/videos using key words. However, the user may forget the key words or there may be too much noise in the environment.

SUMMARY

This disclosure relates to an image capture device for capturing content based on smile detection. An image capture device may include a housing. The housing may carry one or more of an image sensor, an optical element, and/or other components. The optical element may guide light within a field of view to the image sensor. The image sensor may generate a visual output signal conveying visual information based on light that becomes incident thereon. The visual information may define visual content. A smile aggregation value may be determined based on analysis of the visual content. The smile aggregation value may be compared to a smile aggregation criterion to determine whether the smile aggregation value satisfies or fails to satisfy the smile aggregation criterion. Responsive to the smile aggregation value satisfying the smile aggregation criterion, capture of the visual content and/or other content may be started. Responsive to the smile aggregation value failing to satisfy the smile aggregation criterion, the capture of the visual content and/or other content may be stopped.

An electronic storage may store visual information, information relating to visual content, information relating to smile detection, information relating to smile aggregation value, information relating to a smile aggregation criterion, information relating to capture of visual content and/or other content, and/or other information.

The housing may carry one or more components of the image capture device. The housing may carry (be attached to, support, hold, and/or otherwise carry) one or more of an image sensor, an optical element, a processor, an electronic storage, and/or other components. In some implementations, the housing may carry one or more displays.

The image sensor may be configured to generate a visual output signal and/or other output signals. The visual output signal may be generated by the image sensor based on light that becomes incident thereon. The visual output signal may convey visual information and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate capturing content based on smile detection. The machine-readable instructions may include one or more computer program components. The computer program components may include one or more of a smile aggregation component, a smile aggregation criterion component, a start component, a stop component, and/or other computer program components.

The smile aggregation component may be configured to determine a smile aggregation value. The smile aggregation value may be determined based on analysis of the visual content and/or other information. In some implementations, the smile aggregation value may be presented on the display(s).

In some implementations, the smile aggregation value may be determined based on number of smiles and number of faces depicted within the visual content. In some implementations, the smile aggregation value may be determined based on a ratio of the number of smiles to the number of faces depicted within the visual content. In some implementations, the smile aggregation value may be determined further based on size of the faces depicted within the visual content.

The smile aggregation criterion component may be configured to compare the smile aggregation value to a smile aggregation criterion. The smile aggregation value may be compared to the smile aggregation criterion to determine whether the smile aggregation value satisfies or fails to satisfy the smile aggregation criterion. In some implementations, the smile aggregation value may satisfy the smile aggregation criterion based on the smile aggregation value exceeding a smile aggregation threshold and/or other information. In some implementations, the smile aggregation value may fail to satisfy the smile aggregation criterion based on the smile aggregation value falling below a non-smile aggregation threshold and/or other information. In some implementations, the smile aggregation threshold and the non-smile aggregation threshold may have the same value.

In some implementations, the smile aggregation value may satisfy the smile aggregation criterion based on a rate of change of the smile aggregation value exceeding a smile aggregation rate threshold and/or other information. In some implementations, the smile aggregation value may fail to the smile aggregation criterion based on a rate of change of the smile aggregation value falling below a non-smile aggregation rate threshold and/or other information. In some implementations, the smile aggregation threshold and the non-smile aggregation threshold may have different values.

The start component may be configured to, responsive to the smile aggregation value satisfying a smile aggregation criterion, start capture of the visual content and/or other content.

The stop component may be configured to, responsive to the smile aggregation value failing to satisfy the smile aggregation criterion, stop the capture of the visual content and/or other content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 4 illustrates an example table of smile probability for different images.

DETAILED DESCRIPTION

Figure 1:
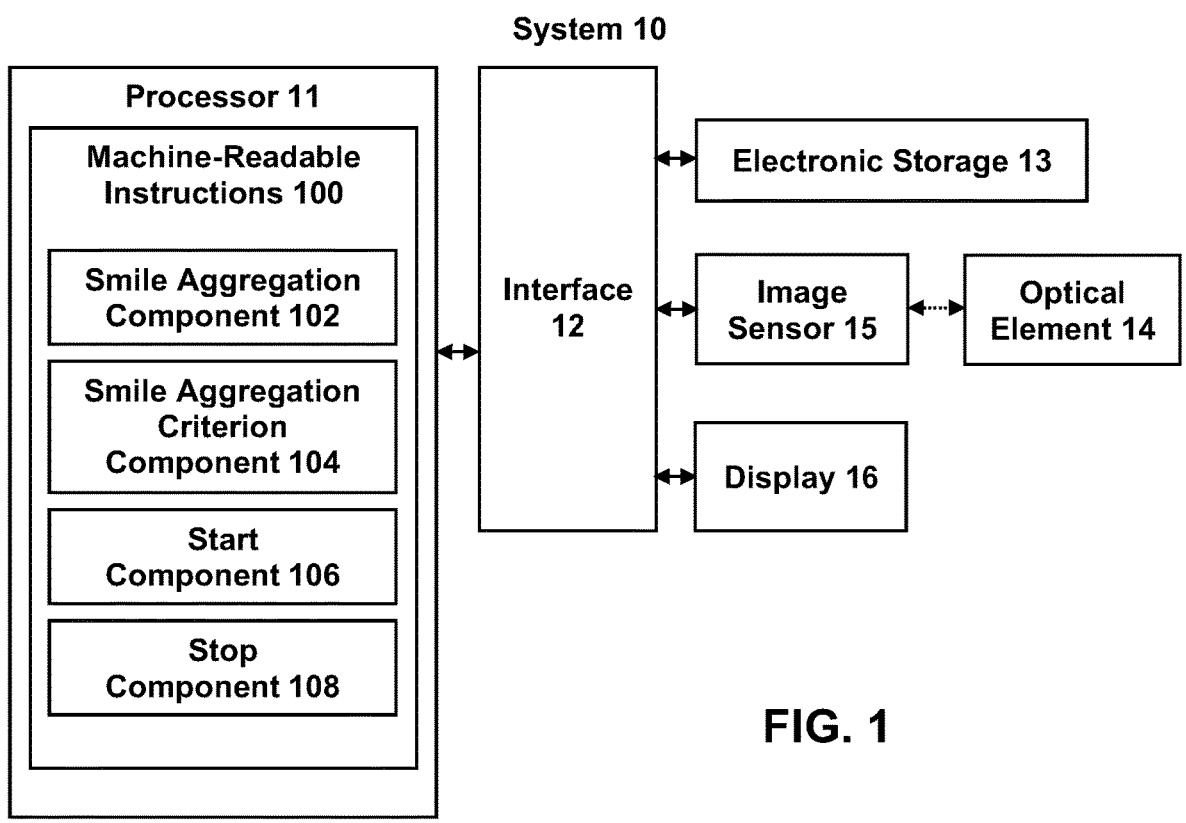
FIG. 1 illustrates an example system for capturing content based on smile detection.

FIG. 1 illustrates a system 10 for capturing content based on smile detection. The system 10 may include one or more of a processor 11, an interface 12 (e.g., bus, wireless interface), an electronic storage 13, an optical element 14, an image sensor 15, a display 16, and/or other components. The system 10 may include and/or be part of an image capture device. The image capture device may include a housing, and one or more of the optical element 14, the image sensor 15, the display 16, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content.

A smile aggregation value may be determined by the processor 11 based on analysis of the visual content. The smile aggregation value may be compared to a smile aggregation criterion by the processor 11 to determine whether the smile aggregation value satisfies or fails to satisfy the smile aggregation criterion. Responsive to the smile aggregation value satisfying the smile aggregation criterion, capture of the visual content and/or other content may be started by the processor 11. Responsive to the smile aggregation value failing to satisfy the smile aggregation criterion, the capture of the visual content and/or other content may be stopped by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to smile detection, information relating to smile aggregation value, information relating to a smile aggregation criterion, information relating to capture of visual content and/or other content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by an array of sound sensors. The audio content may be captured by sound sensors of the image capture device (e.g., microphones of and/or coupled to the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the visual information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the display 16 of the system 10 may be carried by the housing of the image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3:
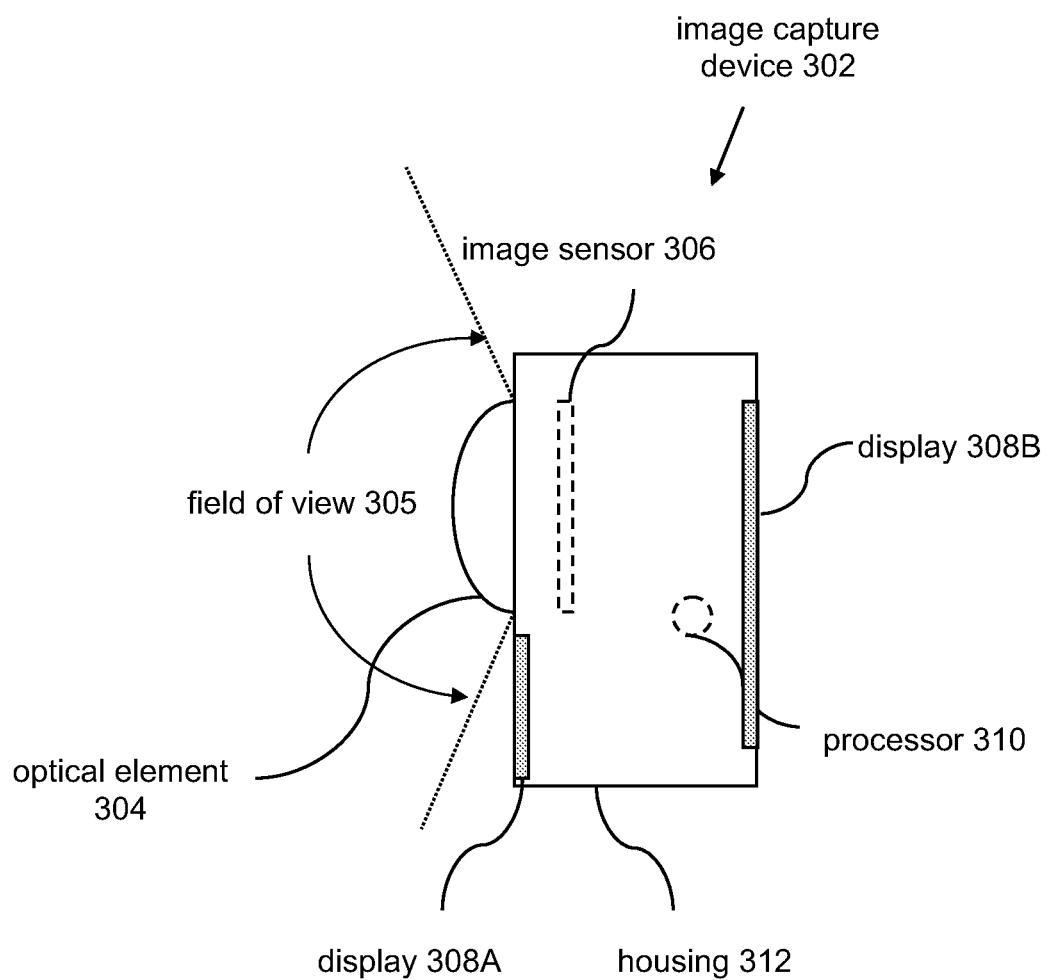
FIG. 3 illustrates an example image capture device.

FIG. 3 illustrates an example image capture device 302. Visual content (e.g., of image(s), video frame(s)) may be captured by the image capture device 302. The image capture device 302 may capture other content, such as audio content. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 carry one or more components of the image capture device 302. The housing 312 may carry (be attached to, support, hold, and/or otherwise carry) one or more of an optical element 304, an image sensor 306, a processor 310, and/or other components. In some implementations, the housing may carry one or more displays, such as a display 308A, a display 308B, and/or other displays. The optical element 304 and the display 308A may be carried on a front side of the housing 312. The display 308A may be a front-facing display of the image capture device 302. The display 308B may be a rear-facing display of the image capture device 302.

In some implementations, the housing 312 may carry multiple image sensors and multiple optical elements. In some implementations, the housing 312 may carry other components, such as one or more sound sensors (e.g., microphone) to capture audio content.

One or more components of the image capture device may be the same as, be similar to, and/or correspond to one or more components of the system 10. For example, referring to FIG. 3, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The display 308A may be the same as, be similar to, and/or correspond to the display 16. The housing may carry other components, such as the electronic storage 13. The image capture device may include other components not shown in FIG. 3. The image capture device may not include one or more components shown in FIG. 3. Other configurations of image capture devices are contemplated.

An optical element may include instrument(s), tool(s), and/or medium that acts upon light passing through the instrument(s)/tool(s)/medium. For example, an optical element may include one or more of lens, mirror, prism, and/or other optical elements. An optical element may affect direction, deviation, and/or path of the light passing through the optical element. An optical element may have a field of view (e.g., field of view 305 shown in FIG. 3). The optical element may be configured to guide light within the field of view (e.g., the field of view 305) to an image sensor (e.g., the image sensor 306).

The field of view may include the field of view of a scene that is within the field of view of the optical element and/or the field of view of the scene that is delivered to the image sensor. For example, referring to FIG. 3, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device may include multiple optical elements. The image capture device may include multiple optical elements that are arranged on the housing to capture spherical images/videos (guide light within spherical field of view to one or more images sensors). For instance, the image capture device may include two optical elements positioned on opposing sides of the housing. The fields of views of the optical elements may overlap and enable capture of spherical images and/or spherical videos.

An image sensor may include sensor(s) that converts received light into output signals. The output signals may include electrical signals. The image sensor may generate output signals conveying visual information that defines visual content of one or more images and/or one or more video frames of a video. For example, the image sensor may include one or more of a charge-coupled device sensor, an active pixel sensor, a complementary metal-oxide semiconductor sensor, an N-type metal-oxide-semiconductor sensor, and/or other image sensors.

The image sensor may be configured generate output signals conveying information that defines visual content of one or more images and/or one or more video frames of a video. The image sensor may be configured to generate a visual output signal based on light that becomes incident thereon and/or other information. The visual output signal may convey visual information that defines visual content having the field of view. For example, referring to FIG. 3, the optical element 304 may be configured to guide light within the field of view 305 to the image sensor 306, and the image sensor 306 may be configured to generate a visual output signal conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor may include conversion of light received by the image sensor into output signals/visual information defining visual content. Capturing visual content may include recording, storing, and/or otherwise capturing the visual content for use in presenting visual content (e.g., live-presentation during capture, subsequent presentation by opening the image/video file). For example, during a capture duration, the visual output signal generated by the image sensor 306 and/or the visual information conveyed by the visual output signal may be used to record, store, and/or otherwise capture the visual content for use in presenting the visual content.

In some implementations, the image capture device may include multiple image sensors. For example, the image capture device may include multiple image sensors carried by the housing to capture spherical images/videos based on light guided thereto by multiple optical elements. For instance, the image capture device may include two image sensors configured to receive light from two optical elements positioned on opposing sides of the housing.

A display may refer to an electronic device that provides visual presentation of information. A display may include a color display and/or a non-color display. In some implementations, a display may include one or more touchscreen displays. A display may be configured to visually present information. A display may be configured to present visual content, user interface, and/or other information. User interface (graphical user interface) may include a graphical form that enables a user to interact with the image capture device and/or see information provided by the image capture device. For example, referring to FIG. 3A, the display 308A and/or the display 308B may preview of visual content being captured by the image capture device 302 (e.g., preview of visual content before and/or during recording), visual content that has been captured by the image capture device 302, information relating to smile detection, information relating to smile aggregation value, and/or other information.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3A, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The processor 310 may analyze the visual content output by one or more image sensors to automatically start or stop capture of the visual content. In some implementations, automatic start or stop of visual content capture may be performed by the processor 310 based on the image capture device 302 operating in an automatic capture mode (e.g., smile trigger mode). The visual content may be analyzed to determine a smile aggregation value (e.g., value of a smile gauge). For example, the smile aggregation value may be determined based on number of faces, smiles, blinks, and/or other features depicted within the visual content. The smile aggregation value may be presented on the display 308A and/or the display 308B.

When the smile aggregation value satisfies a smile aggregation criterion (e.g., the smile gauge is full, the smile gauge has reached/gone beyond a threshold value), visual content capture may be started. Visual content capture may include recording, storing, and/or otherwise capturing the visual content for use in presenting visual content. Visual content capture may include capture of a single image, capture of multiple images (e.g., periodic capture, burst capture), capture of a video, and/or other types of visual content capture. When the aggregation value fails to satisfy the smile aggregation criterion (e.g., the smile gauge is not full, the smile gauge has fallen below a threshold value), visual content capture may be stopped.

In some implementations, information on detected features within the visual content (e.g., number of faces, smiles, blinks) may be stored with the visual content. For instance, information on detected features within the visual content may be stored as metadata of captured images and/or videos. Such information may be used to automatically generate media edits (e.g., automatic generation of videos/slideshow of people smiling).

Referring back to FIG. 1, the processor 11 (or one or more components of the processor 11) may be configured to obtain information to facilitate automatic control of display operation. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, convolutional neural networks, generative adversarial networks, and/or other mechanisms for electronically processing information. The processor 11 may be configured to execute one or more machine-readable instructions 100 to facilitate capturing content based on smile detection. The machine-readable instructions 100 may include one or more computer program components. The machine-readable instructions 100 may include one or more of a smile aggregation component 102, a smile aggregation criterion component 104, a start component 106, a stop component 108, and/or other computer program components.

The smile aggregation component 102 may be configured to determine a smile aggregation value. The smile aggregation value may be determined based on analysis of the visual content and/or other information. Analysis of the visual content may include examination, processing, studying, classification, and/or other analysis of the visual content. For example, content detection (e.g., face detection, smile detection) may be performed on the visual content to determine the smile aggregation value.

The smile aggregation value may include one or more of numbers, characters, categories, and/or other values. The smile aggregation value may refer to a vlue that indicates, reflects, and/or characterizes whether one or more persons/faces depicted within the visual content are smiling over a period of time. The smile aggregation value may include aggregation of smile detection over a period of time. For example, rather than providing a score for the number of people smiling at a particular point in time, the smile aggregation value may provide a score that tracks how people depicted in the visual content are smiling/not smiling over a period of time.

The smile aggregation value may be changed (e.g., increased/decreased) based on detection of smile within the visual content. Smile detection may provide a definite (e.g., yes or no) or probability value of whether individual persons depicted in the visual content is smiling. For example, FIG. 4 illustrates an example table of smile probability for different images captured by an image capture device. In FIG. 4, four faces may be detected and/or tracked through four images. Smile detection may provide values of probability that the individual detected/tracked faces includes a smile. For example, in Image 01, the probability that Face A includes a smile may be 0%. In Image 02, the probability that Face A includes a smile may be 30%. In Image 03, the probability that Face A includes a smile may be 60%. In Frame 04, the probability that Image A includes a smile may be 90%. In some implementation, face detection may be used to determine definite/probability value that a particular thing depicted within the visual content is a face.

While the probability values are shown in FIG. 4 as percentage values, this is merely as an example and is not meant to be limiting. Use of other values, scores, and categorization to characterize content depicted within the visual content are contemplated.

In some implementations, the smile aggregation value may be increased based on detection of smile in the visual content. A smile may be detected for a face in the visual content based on the smile detection providing a definite identification of a smile on the face in the visual content and/or based on the probability value of smile on the face in the visual content satisfying (e.g., being greater than, being greater than or equal to, rising above) a smile detection threshold value. For instance, based on the smile detection providing a probability value of greater than 60% that a smile is on a face, the smile may be detected and the smile aggregation value may be increased. For example, the smile aggregation value may be incremented (e.g., by value X) for every face in the visual content that is detected to be smiling. The smile aggregation value may have a maximum limit value such that the smile aggregation value does not rise above the maximum limit value. Other increase in the smile aggregation value is contemplated.

In some implementations, the smile aggregation value may be decreased based on lack of smile in the visual content. A lack of smile may be detected for a face in the visual content based on the smile detection providing a definite identification of no smile on the face in the visual content and/or based on the probability value of smile on the face in the visual content failing to satisfy (e.g., being less than or equal to, being less than) a non-smile detection threshold value. The non-smile detection threshold value may be the same as or different from the smile detection threshold value. For instance, based on the smile detection providing a probability value of less than 40% that a smile is on a face, the lack of smile may be detected and the smile aggregation value may be decreased. For example, the smile aggregation value may be decremented (e.g., by value Y) for every face in the visual content that is detected to be not smiling. As another example, the smile aggregation value may be decremented (e.g., by value Y) when all faces in the visual content are detected to be not smiling. The value by which the smile aggregation value is increased and decreased (e.g., incremented and decremented) may be the same or different (e.g., value X is equal to value Y, value X is not equal to value Y). The smile aggregation value may have a minimum limit value such that the smile aggregation value does not fall below the minimum limit value. Other decrease in the smile aggregation value is contemplated.

Figure 5:
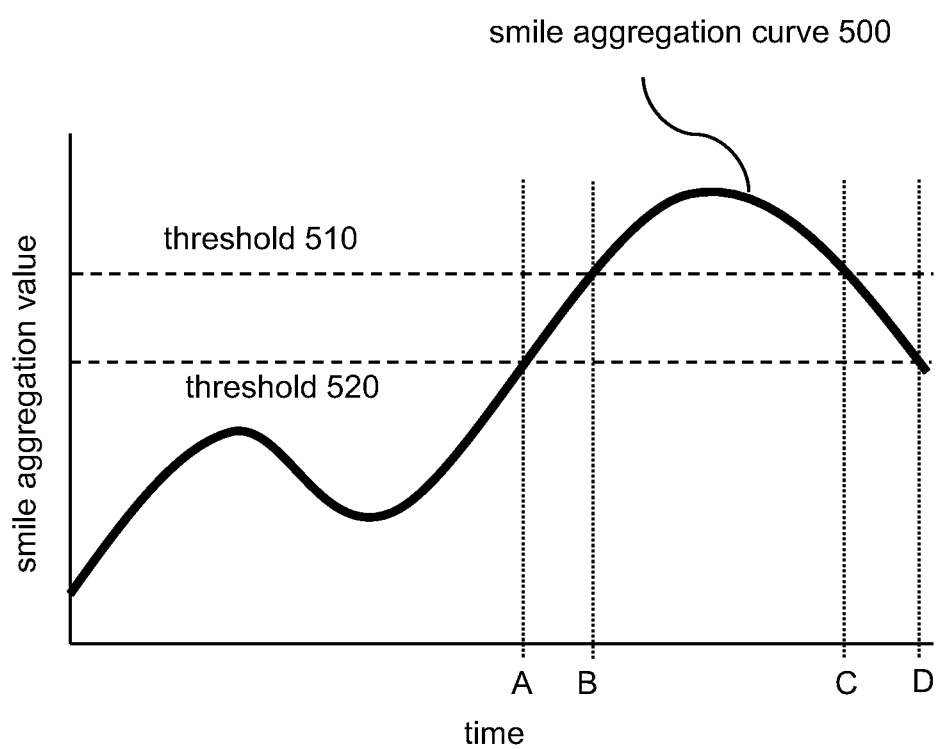
FIG. 5 illustrates an example smile aggregation curve.

FIG. 5 illustrates an example smile aggregation curve 500. The smile aggregation curve 500 may show smile aggregation values at different points in time. The smile aggregation curve 500 may increase based on detection of smile in the visual content and decrease based on lack of smile in the visual content.

In some implementations, the smile aggregation value may be determined based on number of smiles and number of faces depicted within the visual content. The number of faces depicted within the visual content may be used to determine whether the smile aggregation value is changed and/or the value to which the smile aggregation value is changed. For example, the number of smiles depicted within the visual content may be used to increase the smile aggregation value, and the smile aggregation value may be divided by the number of faces depicted within the visual content. As another example, rather than dividing the smile aggregation value by the number of faces, the smile aggregation value may be divided by a square-root of the number of faces. Using the square-root may result in the division having smaller effect as the number of people/faces increases. The smile aggregation value may increase more rapidly when more smiling people/faces are depicted in the visual content.

In some implementations, the smile aggregation value may be decreased based on changes in the number of people/faces depicted within the visual content. For example, when a person enters or leaves the field of view of the image capture device, the smile aggregation value may be decreased. This may decrease the likelihood of content being captured when people/faces are entering/leaving the scene. This may give time for the people in the scene (remaining person(s), new person(s)) to smile before content is captured.

In some implementations, the smile aggregation value may be determined based on a ratio of number of smiles to number of faces depicted within the visual content. The ratio of number of smiles to number of faces may be used to determine how the smile aggregation value may be changed.

For example, a threshold fraction of faces may need to be smiling before the smile aggregation value is increased. A maximum limit may be placed on the smile aggregation value based on the ratio of number of smiles to the number of faces. For example, there may be an upper limit on how high the smile aggregation value may rise if someone/some fraction of people depicted in the visual content is not smiling.

In some implementations, the smile aggregation value may be determined further based on size of the faces depicted within the visual content. Size of a face depicted within the visual content may refer to the size of area that is taken up by the face in the visual content. Size of a face depicted within the visual content may refer to the degree/angle that is taken up by the face in the visual content. Size of a face depicted within the visual content may determine whether the smile aggregation value is changed and/or the value to which the smile aggregation value is changed. For example, different weights may be used for different sizes of faces such that larger faces have greater impact on the change in the smile aggregation value and smaller faces have less impact on the change in the smile aggregation value. Size of a face may be used to determine whether the face (and smile/lack of smile on the face) will be used in determining the smile aggregation value. For example, a median size of all faces depicted within the visual content may be determined, and only those faces that are larger than the median size may be considered when determining the smile aggregation value. Use of other threshold size to include/exclude faces from smile aggregation value determination is contemplated.

In some implementations, the smile aggregation value may be determined further based on eyes of the faces depicted within the visual content. Eyes of the faces depicted within the visual content may be analyzed to determine whether they are open or closed. The smile aggregation value may be decreased based on eyes of the faces depicted within the visual content being closed.

In some implementations, the smile aggregation value may be presented on one or more displays (e.g., the display 16 in FIG. 1, the display 308A and/or the display 308B in FIG. 3). Presenting the smile aggregation value on the display(s) may enable user(s) of the image capture device to see how the smile aggregation value changes as people in the field of view of the image capture device smile/do not smile. Presenting the smile aggregation value may include showing the current smile aggregation value and/or multiple smile aggregation values (e.g., smile aggregation curve).

The determination of the smile aggregation value disclosed herein may provide greater continuity of values than use of simple smile detection. Using smile detection to increase/decrease the smile aggregation value may result in the smile aggregation smoothly changing in value, such as shown in FIG. 5. Probability of smile provided by smile detection, on the other hand, may change erratically. Presenting such values to a user may confuse or frustrate the user. Presenting smile aggregation value may result in a better experience for the user as the user is able to see the changes in the value as a result of people smiling/not smiling in front of the image capture device.

The smile aggregation criterion component 104 may be configured to compare the smile aggregation value to a smile aggregation criterion. The smile aggregation value may be compared to the smile aggregation criterion to determine whether the smile aggregation value satisfies or fails to satisfy the smile aggregation criterion. The smile aggregation criterion may refer to one or more standards and/or factors by which content capture is automatically started. The smile aggregation criterion may refer to one or more standards and/or factors by which content capture is automatically stopped. The smile aggregation value satisfying the smile aggregation criterion may include the smile aggregation value meeting the standard(s) and/or factor(s) of the smile aggregation criterion. The smile aggregation value failing to satisfy the smile aggregation criterion may include the smile aggregation value not meeting the standard(s) and/or factor(s) of the smile aggregation criterion.

In some implementations, the smile aggregation value may satisfy the smile aggregation criterion based on the smile aggregation value exceeding a smile aggregation threshold and/or other information. The smile aggregation threshold may specify a level of smile aggregation value that the smile aggregation value must rise above for the smile aggregation value to satisfy the smile aggregation criterion. In some implementations, the smile aggregation value may satisfy the smile aggregation criterion based on the smile aggregation value being equal to the smile aggregation threshold.

In some implementations, the smile aggregation value may fail to satisfy the smile aggregation criterion based on the smile aggregation value falling below a non-smile aggregation threshold and/or other information. The non-smile aggregation threshold may specify a level of smile aggregation value that the smile aggregation value must drop below for the smile aggregation value to fail to satisfy the smile aggregation criterion. In some implementations, the smile aggregation value may fail to satisfy the smile aggregation criterion based on the smile aggregation value being equal to the non-smile aggregation threshold.

In some implementations, the smile aggregation threshold and the non-smile aggregation threshold may have the same value. A single threshold value may be used as the smile aggregation threshold and the non-smile aggregation threshold. For example, referring to FIG. 5, threshold 510 or threshold 520 may be used as both the smile aggregation threshold and the non-smile aggregation threshold.

In some implementations, the smile aggregation threshold and the non-smile aggregation threshold may have different values. Different threshold values may be used as the smile aggregation threshold and the non-smile aggregation threshold. For example, referring to FIG. 5, the threshold 510 may be used as the smile aggregation threshold and the threshold 520 may be used as the non-smile aggregation threshold, or vice versa.

In some implementations, the smile aggregation value may satisfy the smile aggregation criterion based on a rate of change of the smile aggregation value exceeding a smile aggregation rate threshold and/or other information. The smile aggregation rate threshold may specify a rate of increase in the smile aggregation value that must be exceeded for the smile aggregation criterion to be satisfied. For example, referring to FIG. 5, rather than using specific values on the smile aggregation curve 500 to determine whether the smile aggregation criterion is satisfied, the slope of the smile aggregation curve 500 may be used to determine whether the smile aggregation criterion is satisfied. The smile aggregation criterion may be satisfied based on the positive slope of the smile aggregation curve 500 being greater than (or equal to) the smile aggregation rate threshold. Large positive slope of the smile aggregation curve 500 may indicate that many faces/people depicted within the visual content are smiling.

In some implementations, the smile aggregation value may fail to the smile aggregation criterion based on a rate of change of the smile aggregation value falling below a non-smile aggregation rate threshold and/or other information. The non-smile aggregation rate threshold may specify a rate of decrease in the smile aggregation value that must be exceeded for the smile aggregation criterion to fail to be satisfied. The smile aggregation rate threshold may be the same as or different from the non-smile aggregation rate threshold.

For example, referring to FIG. 5, the slope of the smile aggregation curve 500 may be used to determine whether the smile aggregation criterion is satisfied. The smile aggregation criterion may fail to be satisfied based on magnitude of the negative slope of the smile aggregation curve 500 being greater than (or equal to) magnitude of the non-smile aggregation rate threshold. Large negative slope of the smile aggregation curve 500 may indicate that many faces/people depicted within the visual content are not smiling.

In some implementations, the smile aggregation criterion may be satisfied or fail to be satisfied further based on eyes of the faces depicted within the visual content. For example, the smile aggregation criterion may specify a minimum number/fraction of people/faces with open eyes for the smile aggregation criterion to be satisfied. The smile aggregation criterion may specify a maximum number/fraction of people/faces with closed eyes for the smile aggregation criterion to fail to be satisfied. The smile aggregation criterion may require both (1) the smile aggregation value to exceed a smile aggregation threshold, and (2) a threshold number/fraction of people/faces depicted within the visual content to have open eyes. In some implementations, the smile aggregation criterion may require all eyes to be opened for the aggregation criterion to be satisfied.

The start component 106 may be configured to, responsive to the smile aggregation value satisfying the smile aggregation criterion, start capture of the visual content and/or other content. The visual content may be captured for use in generating a single image, multiple images (e.g., burst images, periodic images), a single video, and/or multiple videos. In some implementations, images may be captured periodically while the smile aggregation criterion is satisfied. For example, images may be captured every second while the aggregation criterion is satisfied. In some implementations, eyes of people/faces depicted within the visual content may be used to selected which image(s) may be kept and which image(s) may be discarded. For example, multiple images may be captured, and images with no/least number of closed eyes may be kept while images with greater number of closed eyes may be discarded.

Starting the capture of the visual content may include starting to record, store, and/or otherwise capture the visual content for use in presenting the visual content (e.g., live-presentation during capture, subsequent presentation by opening the image/video file). Starting the capture of the visual content may include starting to record, store, and/or otherwise capture the visual content in one or more files (e.g., image file(s), video file(s). Starting the capture of the visual content may include starting generation of one or more images and/or one or more videos and storing the image(s) and/or the video(s) in permanent storage.

Starting the capture of the visual content may include capture of new visual content. For example, responsive to the smile aggregation value satisfying the smile aggregation criterion, new visual content may be captured for storage as image(s)/video(s). Starting the capture of the visual content may include storage of existing visual content. For example, responsive to the smile aggregation value satisfying the smile aggregation criterion, existing visual content output by the image sensor(s) may be stored in one or more images. For instance, the visual content output by the image sensor(s) may be temporarily stored while the smile aggregation value is determined and compared to the smile aggregation criterion. Based on the smile aggregation value failing to satisfy the smile aggregation criterion, the visual content may be deleted. Based on the smile aggregation value satisfying the smile aggregation criterion, the visual content may be stored in permanent storage.

In some implementations, the visual content may continue to be captured while the smile aggregation criterion is satisfied. For example, referring to FIG. 5, the smile aggregation curve 500 may satisfy the smile aggregation criterion between time B and time D. The smile aggregation curve 500 may satisfy the smile aggregation criterion at time B based on the smile aggregation curve 500 rising above the threshold 510, and the smile aggregation curve 500 may fail to satisfy the smile aggregation criterion at time D based on the smile aggregation curve 500 falling below the threshold 520. The visual content capture may be started at time B and continue until time D. For example, a video may be captured between time B and time D, or images may be captured periodically between time B and time D. Other capture of visual content is contemplated.

In some implementations the start component 106 may, responsive to the smile aggregation value satisfying the smile aggregation criterion, start capture of audio content. The start component 106 may start capture of both visual content and audio content, such as for generation of a video. The start component 106 may start capture of other content, such as metadata for the visual content.

The stop component 108 may be configured to, responsive to the smile aggregation value failing to satisfy the smile aggregation criterion, stop the capture of the visual content and/or other content. Stopping the capture of the visual content may include stopping the recording, storing, and/or other capturing of the visual content. Stopping the capture of the visual content may include stopping the recording, storing, and/or other capturing of the visual content in one or more file. Stopping the capture of the visual content may include stopping the generation of one or more images and/or one or more videos and stooping the storage of the image(s) and/or the video(s) in permanent storage. For example, referring to FIG. 5, visual content capture (started at time B) may be stopped at time D based on the smile aggregation curve 500 failing to satisfy the smile aggregation criterion at time D.

In some implementations, the stopping of the capture of the visual content may not stop other uses of the visual content. For example, the visual content output by the image sensor continue to be used to determine the smile aggregation value and to determine whether or not the smile aggregation criterion is satisfied. In some implementations, the visual content output by the image sensor may be temporality stored. If the smile aggregation value briefly fails to satisfy the smile aggregation criterion (e.g., the smile aggregation value falls below the threshold value for less than a threshold duration of time), the temporality stored visual content may be used to bridge the previously captured visual content and the newly captured visual content. The temporality stored visual content may be stored in permeant storage based on the smile aggregation value briefly failing to satisfy the smile aggregation.

In some implementations the stop component 108 may, responsive to the smile aggregation value failing to satisfy the smile aggregation criterion, stop capture of audio content. The stop component 108 may stop capture of both visual content and audio content. The stop component 108 may stop capture of other content, such as metadata for the visual content.

In some implementations, captured visual content may be discarded. For example, open eye/closed eye detection may be performed on the captured visual content, and visual content with too many closed eyes (e.g., number/fraction of closed eyes being higher than threshold number/fraction) may be deleted. As another example, if the duration over which the visual content was captured is too short (e.g., shorter than a threshold duration), then visual content may be deleted.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
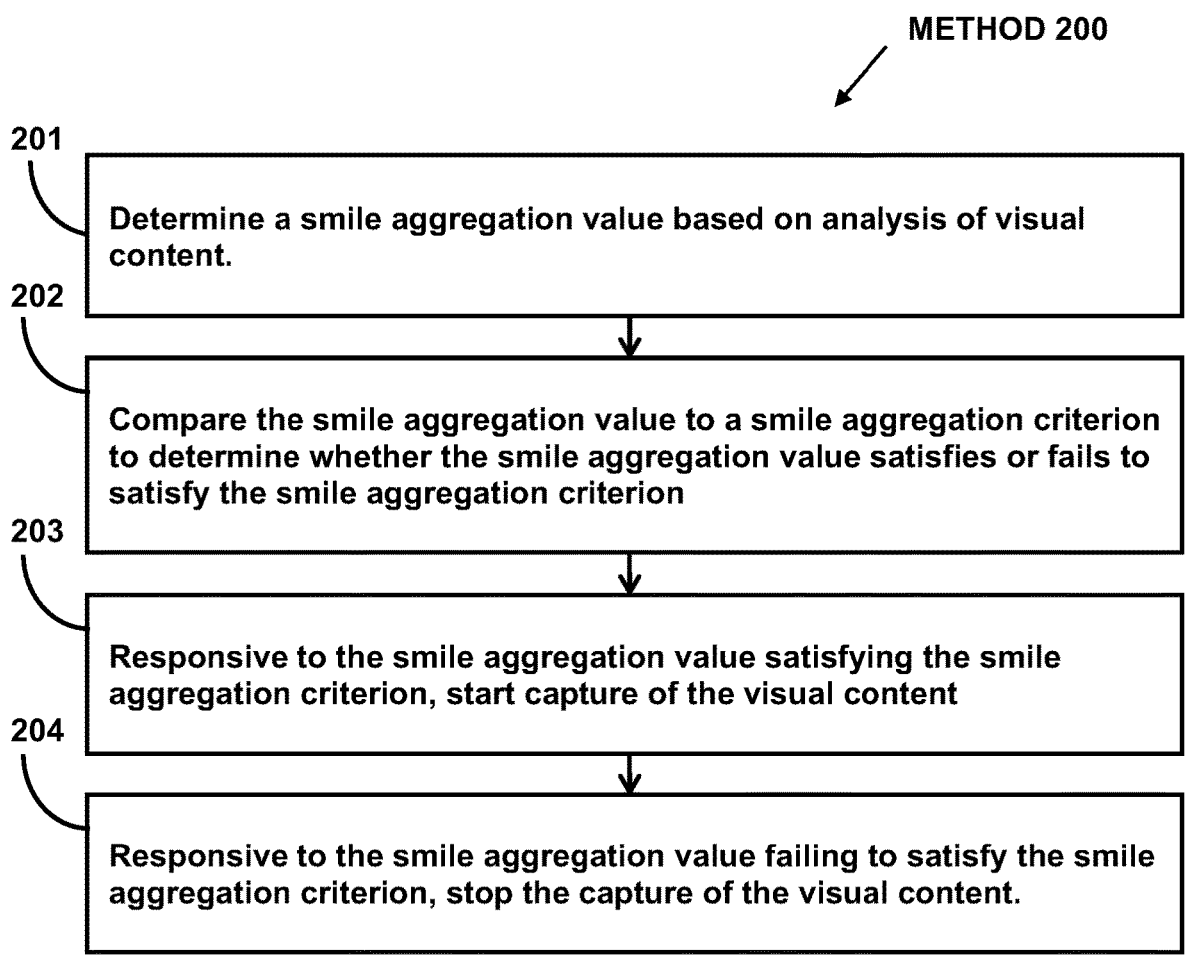
FIG. 2 illustrates an example method for capturing content based on smile detection.

FIG. 2 illustrates method 200 for capturing content based on smile detection. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may have multiple sides. The housing may carry one or more of an image sensor, an optical element, a display, and/or other components. The optical element may guide light within a field of view to the image sensor. The image sensor may generate a visual output signal conveying visual information defining visual content based on light that becomes incident thereon.

At operation 201, a smile aggregation value may be determined based on analysis of the visual content. In some implementation, operation 201 may be performed by a processor component the same as or similar to the smile aggregation component 102 (Shown in FIG. 1 and described herein).

At operation 202, the smile aggregation value may be compared to a smile aggregation criterion to determine whether the smile aggregation value satisfies or fails to satisfy the smile aggregation criterion. In some implementations, operation 202 may be performed by a processor component the same as or similar to the smile aggregation criterion component 104 (Shown in FIG. 1 and described herein).

At operation 203, responsive to the smile aggregation value satisfying the smile aggregation criterion, capture of the visual content and/or other content may be started. In some implementation, operation 203 may be performed by a processor component the same as or similar to the start component 106 (Shown in FIG. 1 and described herein).

At operation 204, responsive to the smile aggregation value failing to satisfy the smile aggregation criterion, the capture of the visual content and/or other content may be stopped. In some implementations, operation 204 may be performed by a processor component the same as or similar to the stop component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor;
a display carried by the housing; and
one or more physical processors carried by the housing, the one or more physical processors configured by machine-readable instructions to:
determine a smile aggregation value based on analysis of the visual content, wherein the smile aggregation value is determined based on number of smiles and number of faces depicted within the visual content;
present the smile aggregation value on the display;
compare the smile aggregation value to a smile aggregation criterion to determine whether the smile aggregation value satisfies or fails to satisfy the smile aggregation criterion;
responsive to the smile aggregation value satisfying the smile aggregation criterion, start capture of the visual content; and
responsive to the smile aggregation value failing to satisfy the smile aggregation criterion, stop the capture of the visual content.

2. The image capture device of claim 1, wherein:
the smile aggregation value is determined further based on size of the faces depicted within the visual content;
the smile aggregation value satisfies the smile aggregation criterion based on the smile aggregation value exceeding a smile aggregation threshold; and
the smile aggregation value fails to satisfy the smile aggregation criterion based on the smile aggregation value falling below a non-smile aggregation threshold.

3. An image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor;
one or more physical processors carried by the housing, the one or more physical processors configured by machine-readable instructions to:
determine a smile aggregation value based on analysis of the visual content;
compare the smile aggregation value to a smile aggregation criterion to determine whether the smile aggregation value satisfies or fails to satisfy the smile aggregation criterion;
responsive to the smile aggregation value satisfying the smile aggregation criterion, start capture of the visual content; and
responsive to the smile aggregation value failing to satisfy the smile aggregation criterion, stop the capture of the visual content.

4. The image capture device of claim 3, wherein the smile aggregation value is determined based on number of smiles and number of faces depicted within the visual content.

5. The image capture device of claim 4, wherein the smile aggregation value is determined based on a ratio of the number of smiles to the number of faces depicted within the visual content.

6. The image capture device of claim 4, wherein the smile aggregation value is determined further based on size of the faces depicted within the visual content.

7. The image capture device of claim 3, wherein the smile aggregation value satisfies the smile aggregation criterion based on the smile aggregation value exceeding a smile aggregation threshold.

8. The image capture device of claim 7, wherein the smile aggregation value fails to satisfy the smile aggregation criterion based on the smile aggregation value falling below a non-smile aggregation threshold.

9. The image capture device of claim 8, wherein the smile aggregation threshold and the non-smile aggregation threshold have the same value.

10. The image capture device of claim 3, wherein the smile aggregation value satisfies the smile aggregation criterion based on a rate of change of the smile aggregation value exceeding a smile aggregation rate threshold.

11. The image capture device of claim 3, wherein:
the image capture device further comprises a display carried by the housing; and
the smile aggregation value is presented on the display.

12. A method for capturing content using smile detection, the method performed by an image capture device, the image capture device including one or more processors, an image sensor, and an optical element, the image sensor configured to generate a visual output signal conveying visual information based on light that becomes incident thereon, the visual information defining visual content, the optical element configured to guide light within a field of view to the image sensor, the method comprising:
determining a smile aggregation value based on analysis of the visual content;
comparing the smile aggregation value to a smile aggregation criterion to determine whether the smile aggregation value satisfies or fails to satisfy the smile aggregation criterion;
responsive to the smile aggregation value satisfying the smile aggregation criterion, starting capture of the visual content; and
responsive to the smile aggregation value failing to satisfy the smile aggregation criterion, stopping the capture of the visual content.

13. The method of claim 12, wherein the smile aggregation value is determined based on number of smiles and number of faces depicted within the visual content.

14. The method of claim 13, wherein the smile aggregation value is determined based on a ratio of the number of smiles to the number of faces depicted within the visual content.

15. The method of claim 13, wherein the smile aggregation value is determined further based on size of the faces depicted within the visual content.

16. The method of claim 12, wherein the smile aggregation value satisfies the smile aggregation criterion based on the smile aggregation value exceeding a smile aggregation threshold.

17. The method of claim 16, wherein the smile aggregation value fails to satisfy the smile aggregation criterion based on the smile aggregation value falling below a non-smile aggregation threshold.

18. The method of claim 17, wherein the smile aggregation threshold and the non-smile aggregation threshold have the same value.

19. The method of claim 12, wherein the smile aggregation value satisfies the smile aggregation criterion based on a rate of change of the smile aggregation value exceeding a smile aggregation rate threshold.

20. The method of claim 12, wherein:
the image capture device further comprises a display carried by a housing; and
the smile aggregation value is presented on the display.

* * * * *